US011879486B2

(12) United States Patent
Chang et al.

(10) Patent No.: US 11,879,486 B2
(45) Date of Patent: Jan. 23, 2024

(54) FLEXIBLE SHOULDER PIN MODULE FOR INSTALLING A PANEL ON AN ASSEMBLY

(71) Applicant: QUANTA COMPUTER INC., Taoyuan (TW)

(72) Inventors: Chun Chang, Taoyuan (TW); Hsin-Chieh Lin, Taoyuan (TW); Yao-Long Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 248 days.

(21) Appl. No.: 17/204,404

(22) Filed: Mar. 17, 2021

(65) Prior Publication Data

US 2022/0196058 A1     Jun. 23, 2022

Related U.S. Application Data

(60) Provisional application No. 63/130,186, filed on Dec. 23, 2020.

(51) Int. Cl.
*F16B 21/08* (2006.01)
*F16B 5/06* (2006.01)

(52) U.S. Cl.
CPC ............ *F16B 21/08* (2013.01); *F16B 5/0607* (2013.01)

(58) Field of Classification Search
CPC ........................... F16B 21/08; F16B 2019/006
See application file for complete search history.

(56) References Cited

U.S. PATENT DOCUMENTS

| 5,845,898 A | * | 12/1998 | Halder | F16B 21/165 269/49 |
| 2018/0156256 A1 | * | 6/2018 | Okumura | H01L 23/4093 |
| 2019/0220065 A1 | * | 7/2019 | Lancaster-Larocque | G06F 1/1656 |

* cited by examiner

*Primary Examiner* — Kyle A Cook
(74) *Attorney, Agent, or Firm* — NIXON PEABODY LLP

(57) ABSTRACT

A flexible shoulder pin module includes a barrel having an annular head portion, a cylindrical body portion, and a through-hole extending from a top surface of the body portion to a bottom end of the head portion; and a shoulder pin having a shaft portion and a shoulder portion formed thereon. The through-hole includes a first portion adjacent to the top surface of the body portion, and a second portion having a greater diameter than the first portion. The shaft portion is insertable through the first portion into the second portion. The shoulder portion is configured to adjustably extend above the top surface of the body portion to clamp a panel thereto. A compressible device is configured to be disposed around the shaft portion and secured by a stopper panel, which is coupled to the shaft portion and placed adjacent to the head portion within the second portion.

12 Claims, 12 Drawing Sheets

800 ↘

```
┌─────────────────────────────────────────────────────────────┐
│ Dispose a shaft portion of the shoulder pin in each flexible shoulder │
│ pin module, before formation, in a through-hole extending from a │
│ top surface of the cylindrical body portion of a barrel in each │
│ flexible shoulder pin module to a bottom end of a wall projecting │── 810
│ outward from a lower surface of an annular head portion of the │
│ barrel, the shaft portion having a bottom surface and a bottom │
│ wall projecting outward from the bottom surface to surround │
│ an opening therein │
└─────────────────────────────────────────────────────────────┘
                              ↓
┌─────────────────────────────────────────────────────────────┐
│ Dispose a compressible device around the shaft portion and within the │── 820
│ through-hole of the barrel of each flexible shoulder pin module │
└─────────────────────────────────────────────────────────────┘
                              ↓
┌─────────────────────────────────────────────────────────────┐
│ Dispose a stopper panel within the through-hole adjacent to │
│ the head portion such that the stopper panel connects with the │
│ bottom surface of the shaft portion, the stopper panel having │── 830
│ an aperture through which the bottom wall of the shaft portion │
│ extends outwards │
└─────────────────────────────────────────────────────────────┘
                              ↓
┌─────────────────────────────────────────────────────────────┐
│ Flare the bottom wall of the shaft portion, using a punching tool, │
│ such that the flared bottom wall is leveled with a bottom surface │── 840
│ of the stopper panel │
└─────────────────────────────────────────────────────────────┘
                              ↓
┌─────────────────────────────────────────────────────────────┐
│ Apply a pressure, using a pressing tool, on the wall projecting outward │
│ from the lower surface of the head portion of the barrel to secure the │
│ stopper panel and the compressible device within the through-hole, │── 850
│ thereby forming a flexible shoulder pin module │
└─────────────────────────────────────────────────────────────┘
```

FIG. 8

FLEXIBLE SHOULDER PIN MODULE FOR INSTALLING A PANEL ON AN ASSEMBLY

CROSS-REFERENCE TO RELATED APPLICATIONS

This application claims benefit of and priority under 35 U.S.C. § 119 to U.S. Provisional Application No. 63/130,186, entitled "Flexible Shoulder Pin," and filed on Dec. 23, 2020. The contents of that application are hereby incorporated by reference in their entirety.

TECHNICAL FIELD

The present disclosure relates generally to installation of a panel to assemblies, and more specifically, to a flexible shoulder pin module used in installing a printed circuit board (PCB) or a panel to an assembly board of an electrical or mechanical assembly.

BACKGROUND

Computing systems, such as servers, include one or more printed circuit boards (PCB) and panels having electrical and mechanical components. The PCBs and panels are installed on various assembly boards. The assembly boards include one or more shoulder pins for installation of the PCBs or panels thereon. The shoulder pins generally known in the art are designed to include a fixed amount of clearance for accommodating the PCBs and panels. The fixed amount of clearance may cause unwanted floating after installation of some PCBs and panels, if the PCBs and panels have a lower thickness than the fixed amount of clearance. The floating may be caused from bowing and turning of the installed PCBs and panels. Accordingly, it is desirable to have shoulder pins that are designed to prevent unwanted floating movement of the installed PCBs and panels.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

In one embodiment, a flexible shoulder pin module for securing a panel to an assembly board is disclosed The flexible shoulder pin module includes a barrel, a shoulder pin, a stopper panel, and a compressible device. The barrel includes an annular head portion, a cylindrical body portion formed on the head portion, and a through-hole. The body portion has a lesser perimeter and a greater height than the head portion. The through-hole extends from a top surface of the body portion to a bottom end of the head portion. The through-hole includes a first portion adjacent to the top surface of the body portion and a second portion having a greater diameter than the first portion. The shoulder pin includes a shaft portion and a shoulder portion formed on the shaft portion. The shaft portion is configured to be insertable through the first portion of the through-hole and extend above the top surface of the body portion. The shoulder portion is configured to adjustably extend above the top surface of the body portion to clamp the panel thereto. The stopper panel is configured to be coupled to the shaft portion within the second portion of the through-hole adjacent to the head portion. The compressible device is configured to be disposed around the shaft portion and secure within the second portion of the through-hole by the stopper panel.

In another embodiment, an assembly having at least one assembly board and a panel is disclosed. The panel is secured to the at least one assembly board by a screw and at least one flexible shoulder pin module. The flexible shoulder pin module includes a barrel, a shoulder pin, a stopper panel, and a compressible device. The barrel includes an annular head portion, a cylindrical body portion formed on the head portion, and a through-hole. The body portion has a lesser perimeter and a greater height than the head portion. The through-hole extends from a top surface of the body portion to a bottom end of the head portion. The through-hole includes a first portion adjacent to the top surface of the body portion and a second portion having a greater diameter than the first portion. The shoulder pin includes a shaft portion and a shoulder portion formed on the shaft portion. The shaft portion is configured to be insertable through the first portion of the through-hole and extend above the top surface of the body portion. The shoulder portion is configured to adjustably extend above the top surface of the body portion to clamp the panel thereto. The stopper panel is configured to be coupled to the shaft portion within the second portion of the through-hole adjacent to the head portion. The compressible device is configured to be disposed around the shaft portion and secured within the second portion of the through-hole by the stopper panel.

In yet another embodiment, a method of installing a panel on an assembly board of an assembly is disclosed. The method includes forming one or more flexible shoulder pin modules and integrating the one or more flexible shoulder pin modules with the assembly board. The method further includes fastening one end of the panel to the assembly board by a screw and inserting each of the one or more flexible shoulder pin modules into a corresponding hole in the panel. The method further includes pressing each of the one or more flexible shoulder pin modules against the panel, until a shoulder portion of a shoulder pin in each of the one or more flexible shoulder pin modules clamps the panel against a top surface of a cylindrical body portion in each of the one or more flexible shoulder pin modules.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure, and its advantages and drawings, will be better understood from the following description of exemplary embodiments together with reference to the accompanying drawings, in which:

FIG. 8 shows a block diagram of a method of forming one or more flexible shoulder pin modules, according to one or more embodiments shown and described herein;

Figure 1A:
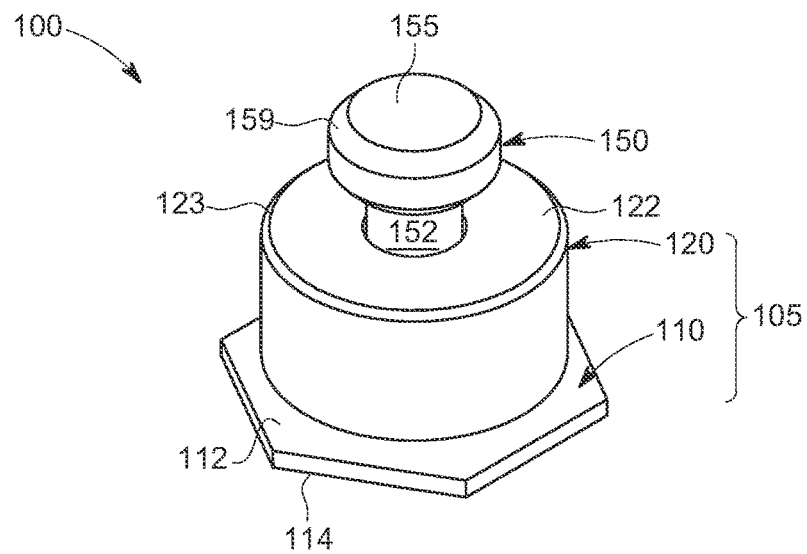
FIG. 1A is a perspective view of a flexible shoulder pin module, according to one or more embodiments shown and described herein.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

Various embodiments of the present disclosure are described with reference to the attached figures, where like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The embodiments are not limited by the illustrated ordering of acts or events, as some acts may occur in different orders and/or concurrently with other acts or events. Furthermore, not all illustrated acts or events are required to implement a methodology in accordance with the present invention.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of" or "within acceptable manufacturing tolerances," or any logical combination thereof, for example.

With regards to the present disclosure, the terms "computing device" or "computing system" or "computing system" or "computer" refer to any electronically-powered or battery-powered equipment that has hardware, software, and/or firmware components, where the software and/or firmware components can be configured for operating features on the device.

Embodiments of the disclosure relate to a flexible shoulder pin module used in installing a printed circuit board (PCB) or a panel to an assembly board of an electrical or mechanical assembly. The flexible shoulder pin module can be adapted for use with PCBs and panels having different thicknesses. The flexible shoulder pin module has a barrel and a shoulder pin configured to adjustably extend above the barrel to secure a PCB or panel of any thickness. The shoulder pin is connected to a compressible device placed within a through-hole in the barrel. This enables PCBs and panels to be quickly secured and released from assembly boards on which they are installed. The flexible shoulder pin module is described with respect to different views presented in FIGS. 1A-1E.

Figure 1B:
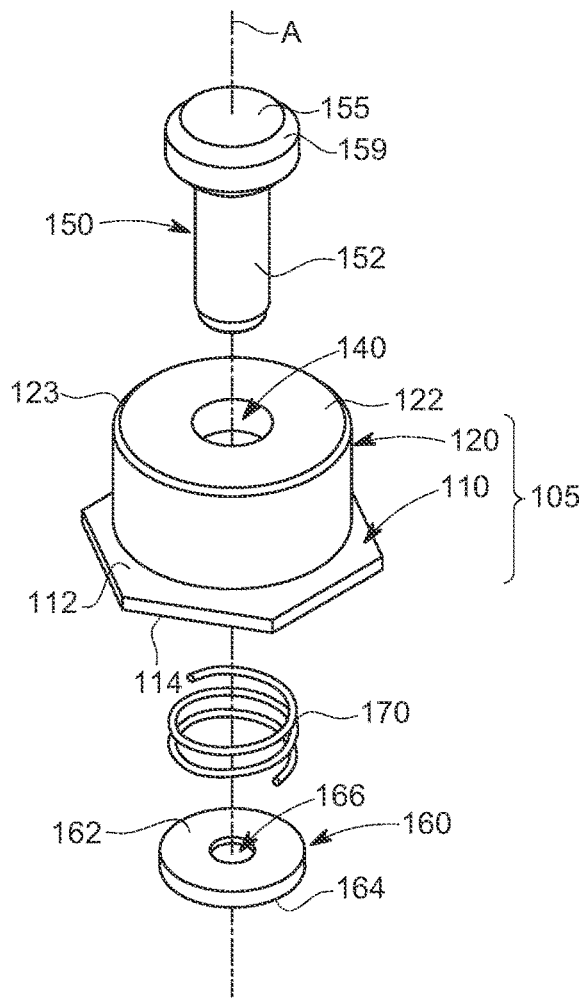
FIG. 1B is an exploded perspective view of the flexible shoulder pin module of FIG. 1A, according to one or more embodiments shown and described herein.
Figure 1C:
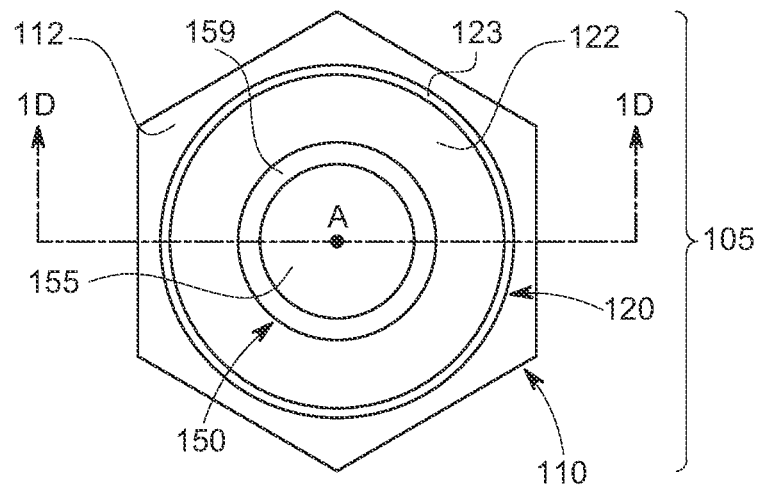
FIG. 1C is a top view of the flexible shoulder pin module of FIG. 1A, according to one or more embodiments shown and described herein.
Figure 1D:
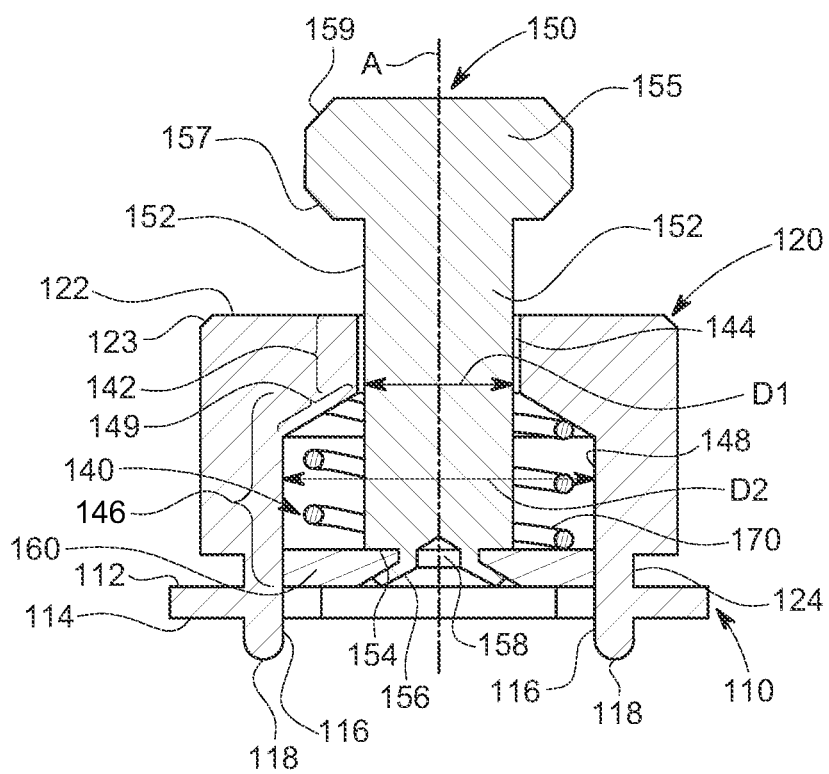
FIG. 1D is a cross-sectional side view of the flexible shoulder pin module of FIG. 1A, according to one or more embodiments shown and described herein.

FIG. 1A is a perspective view, and FIG. 1B is an exploded perspective view of a flexible shoulder pin module 100. FIG. 1C is a top view of the flexible shoulder pin module 100. FIG. 1D is a cross-sectional side view, and FIG. 1E is a cross-sectional perspective view of the flexible shoulder pin module 100.

The flexible shoulder pin module 100 includes a barrel 105, a shoulder pin 150, a stopper panel 160, and a compressible device 170. The barrel 105, the shoulder pin 150, and the stopper panel 160 are made from a free-cutting steel such as, but not limited to, stainless steel, carbon steel, and the like. The barrel 105 includes an annular head portion 110, a cylindrical body portion 120 and a through-hole 140 (FIGS. 1D-1E). The head portion 110 has a base of a closed geometric shape. In the embodiment shown in FIGS. 1A-1E, the head portion 110 has a hexagon-shaped base. However, other shapes such as a circle, square, pentagon, and the like are also contemplated for the head portion 110. The head portion 110 has a perimeter $P_h$ and a height $H_h$. The head portion has an upper surface 112, a lower surface 114 (FIGS. 1D-1E), and a wall 116 projecting outward from the lower surface 114 (FIGS. 1D-1E). The wall 116 has a bottom end 118.

The body portion 120 has a base of a closed geometric shape. In the embodiment shown in FIGS. 1A-1E, the body portion 120 has a circular base. However, other shapes such as a square, pentagon, hexagon, and the like are also contemplated for the body portion 120. The body portion 120 has a top surface 122 with a chamfered edge 123 (FIGS. 1A-1D). The body portion 120 is connected to the head portion 110 through a notch 124 (FIGS. 1D-1E) around the body portion 120. The body portion 120 has a perimeter $P_b$ less than the perimeter $P_h$ of the head portion 110. The body portion 120 has a height $H_b$ greater than the height $H_h$ of the head portion 110.

Figure 1E:
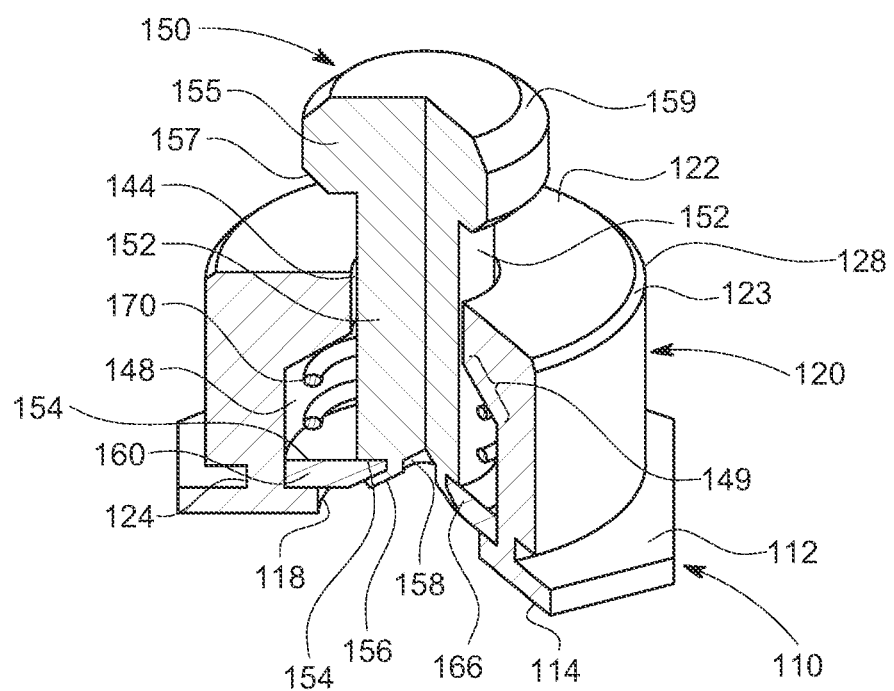
FIG. 1E is a cross-sectional perspective view of the flexible shoulder pin module of FIG. 1A, according to one or more embodiments shown and described herein.

As shown in FIGS. 1D-1E, the through-hole 140 in the barrel extends from the top surface 122 of the body portion 120 to the bottom end 118 of the wall 116 projecting outward from the lower surface 114 of the head portion 110. The through-hole 140 has a first portion 142 adjacent to the top surface 122 of the body portion 120. The first portion 142 of the through-hole 140 has a first wall 144 at a first diameter $D_1$. The through-hole 140 has a second portion 146 between the first portion 142 and the bottom surface 114 of the head portion 110. The second portion 146 of the through-hole 140 has a second wall 148 at a second diameter $D_2$. The second diameter $D_2$ is greater than the first diameter $D_1$, and thus the second portion 146 of the through-hole 140 has more volume than the first portion 142 of the through-hole 140. In some embodiments such as shown in FIGS. 1A-1E, the second wall 148 of the second portion 146 of the through-hole 140 is flared to connect with the first wall 144 of the first portion 142 of the through-hole 140.

The shoulder pin 150 includes a shaft portion 152 and a shoulder portion 155 formed on the shaft portion 152. The shaft portion 152 is configured to be insertable through the first portion 142 of the through-hole 140. The shaft portion 152 extends through the through-hole 140 above the top surface 122 of the body portion 120. The shaft portion 152 has a bottom surface 154 and a bottom wall 156 projecting outward from the bottom surface 154 to surround an opening 158. The bottom wall 156 projects vertically outward upon construction but is flared during the formation of the flexible shoulder pin module 100.

Figure 2A:
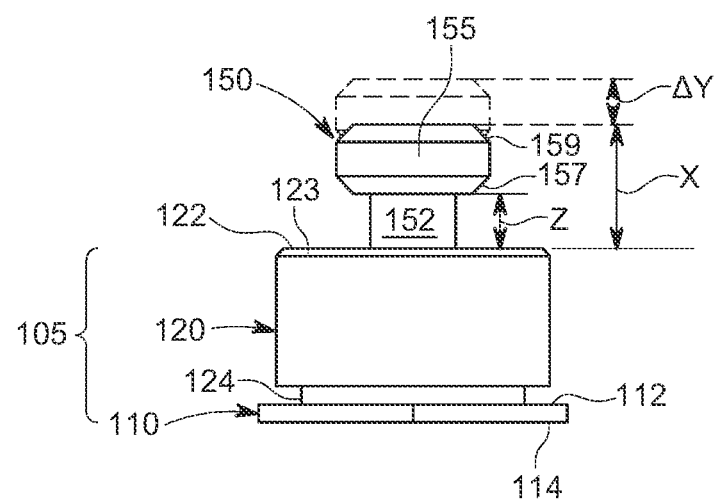
FIG. 2A is a side view of the flexible shoulder pin module of FIG. 1A showing adjustability of the flexible shoulder pin therein, according to one or more embodiments shown and described herein.
Figure 2B:
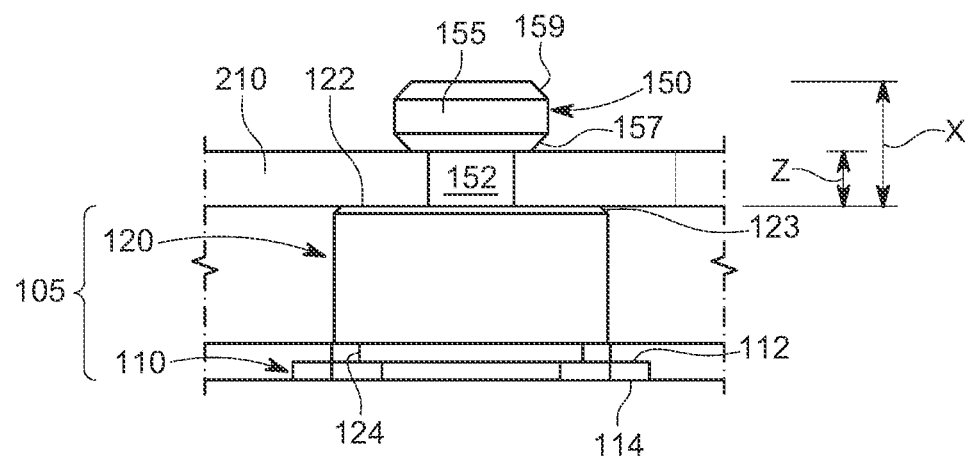
FIG. 2B is a side view of the flexible shoulder pin module of FIG. 1A installed on a panel, according to one or more embodiments shown and described herein.

The shoulder portion 155 has an upper chamfered edge 159 and a lower chamfered edge 157. The acts as knob for maneuvering the shaft portion 152 within the through-hole 140 to accommodate PCBs and panels of varying thicknesses. FIG. 2A is a side view of the flexible shoulder pin module 100 showing adjustability of the shoulder pin 150, while FIG. 2B is a side view of the flexible shoulder pin module 100 installed on a panel such a PCB 210. The shoulder portion 155 of the shoulder pin 150 is configured to adjustably extend by a distance 'y' above the top surface 122 of the body portion 120 to accommodate the PCB 210 having a thickness 'z'. The shoulder portion 155 clamps the PCB 210 or another panel to the top surface 122 of the body portion 120. The lower chamfered edge 157 of the shoulder portion 155 acts as a lead-in to minimize the contact force on the PCB 210.

Referring back to FIGS. 1A-1E again, the compressible device 170 is configured to be disposed around the shaft portion 152 and secured within the second portion 146 of the through-hole 140 by the stopper panel 160. In some embodiments, the compressible device 170 is a mechanical spring. The compressible device 170 is configured to compress within the second portion 146 of the through-hole 140, when pressed down by the shoulder pin 150, to secure the PCB 210 or another panel to an assembly board. The compressible device 170 is configured to decompress within the second portion 146 of the through-hole 140, when lifted up by the shoulder pin 150, to release the PCB 210 or another panel from the assembly board.

The stopper panel 160 is configured to be disposed within the second portion 146 of the through-hole 140. The stopper panel 160 is generally positioned adjacent to the head portion 110. The stopper panel 160 has an upper surface 162, a lower surface 164 and an aperture 166 between the upper surface 162 and the lower surface 164. The bottom wall 156 of the shaft portion 152 is disposed through the aperture 166. As discussed below, the bottom wall 156 is flared to become level with the lower surface 164 of the stopper panel 160.

FIGS. 3A-3D depict cross-sectional side views of a method 800 of forming the flexible shoulder pin module 100. The method 800 is represented by the block diagram in FIG. 8. At block 810, a shaft portion of a shoulder pin of a flexible shoulder pin module, before formation, is disposed in a through-hole extending from a top surface of the cylindrical body portion of a barrel in the flexible shoulder pin module to a bottom end of a wall projecting outward from a lower surface of an annular head portion of the barrel. The shaft portion has a bottom surface and a bottom wall projecting outward from the bottom surface to surround an opening therein. In the embodiment shown in FIG. 3A, the shaft portion 152 of a shoulder pin 150 is disposed in the through-hole 140 extending from the top surface 122 of the body portion 120 of the barrel 105 to the bottom end 118 of the wall 116 projecting outward from the lower surface 114 of the head portion 110 of the barrel 105.

At block 820, a compressible device is disposed around the shaft portion and within the through-hole of the barrel. In the embodiment shown in FIG. 3A, the compressible device 170 is disposed around the shaft portion 152 within the second portion 146 of the through-hole 140. At block 830, a stopper panel is disposed within the through-hole adjacent to the head portion such that the stopper panel connects with the bottom surface of the shaft portion. The stopper panel has an aperture through which the bottom wall of the shaft portion extends outwards. In the embodiment shown in FIG. 3A, the stopper panel 160 is disposed within the through-hole 140 adjacent to the head portion 110, such that the stopper panel 160 connects with the bottom surface 154 of the shaft portion 152, and the bottom wall 156 of the shaft portion 152 extends outwards through the aperture 166 of the stopper panel 160.

At block 840, the bottom wall of the shaft portion is flared, using a punching tool, such that the flared bottom wall is leveled with a bottom surface of the stopper panel. In the embodiment shown in FIG. 3B, the bottom wall 156 of the shaft portion 152 is flared such that the now-flared bottom wall 156 is leveled with the lower surface 164 of the stopper panel 160. The bottom wall 156 may be flared by first placing the shoulder portion 155 within an opening 335 in the anvil 330 such that top surface 122 of the body portion 120 rests against an upper surface 332 of the anvil. A punching tool 380 is then used through the aperture 158 of the stopper panel 160 with a force directed towards the opening 158 of the shaft portion 152.

Figure 3A:
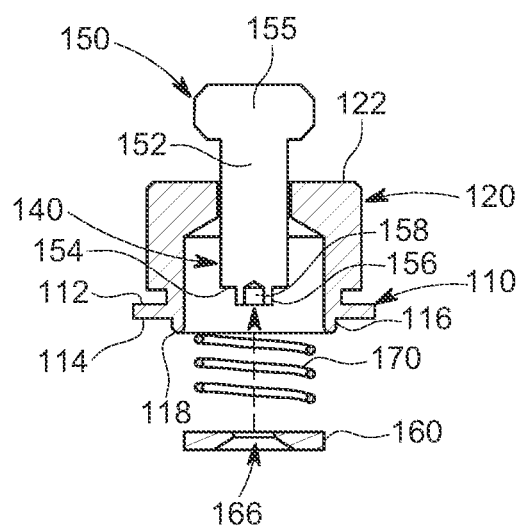
FIG. 3A is a cross-sectional side view of initial method step(s) of forming the flexible shoulder pin module of FIG. 1A, according to one or more embodiments shown and described herein.
Figure 3B:
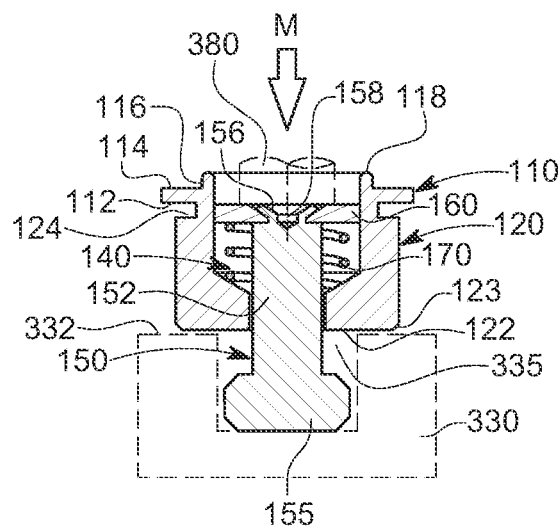
FIG. 3B is a cross-sectional side view of a first method step of forming the flexible shoulder pin module of FIG. 1A, according to one or more embodiments shown and described herein.
Figure 3C:
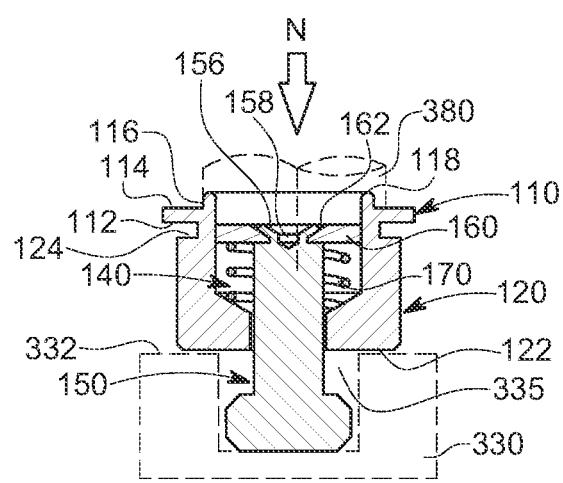
FIG. 3C is a cross-sectional side view of a second method step, subsequent to the first method step of FIG. 3B, of forming the flexible shoulder pin module of FIG. 1A, according to one or more embodiments shown and described herein.
Figure 3D:
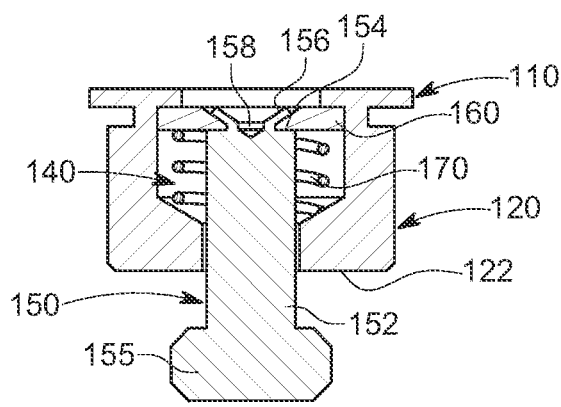
FIG. 3D is a cross-sectional side view of the flexible shoulder pin module of FIG. 1A formed by the method steps of FIGS. 3A-3C, according to one or more embodiments shown and described herein.

At block 850, a pressure is applied, using a pressing tool, on the wall projecting outward from the lower surface of the head portion of the barrel to secure the stopper panel and the compressible device within the through-hole, thereby forming the flexible shoulder pin module. In the embodiment shown in FIG. 3C, a pressure is applied, using a pressing tool, on the wall 118 projecting outward from the lower surface 114 of the head portion 110 to secure the stopper panel 160 and the compressible device 170 within the through-hole 140, thus forming the flexible shoulder pin module 100. The punching tool 380 may be used as the pressing tool for this method step. However, in different embodiments, a dedicated pressing tool, different from the punching tool 380 may be used. FIG. 3D shows a cross-sectional side view of the flexible shoulder pin module 100 formed by the method 800 shown through FIGS. 3A-3C.

Figure 4A:
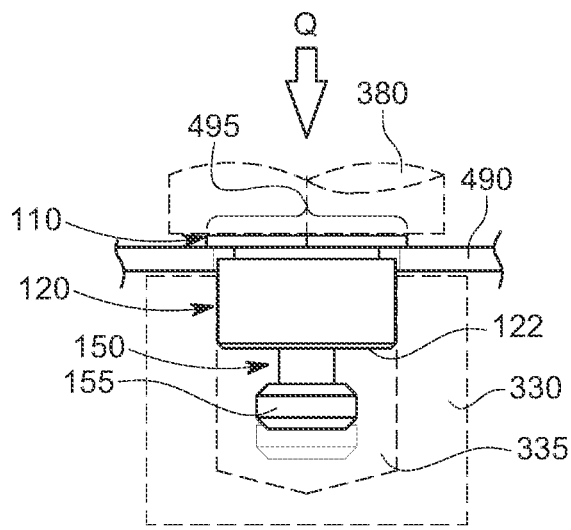
FIG. 4A is a side view of a method step of integrating a flexible shoulder pin module with an assembly board, according to one or more embodiments shown and described herein.
Figure 9:
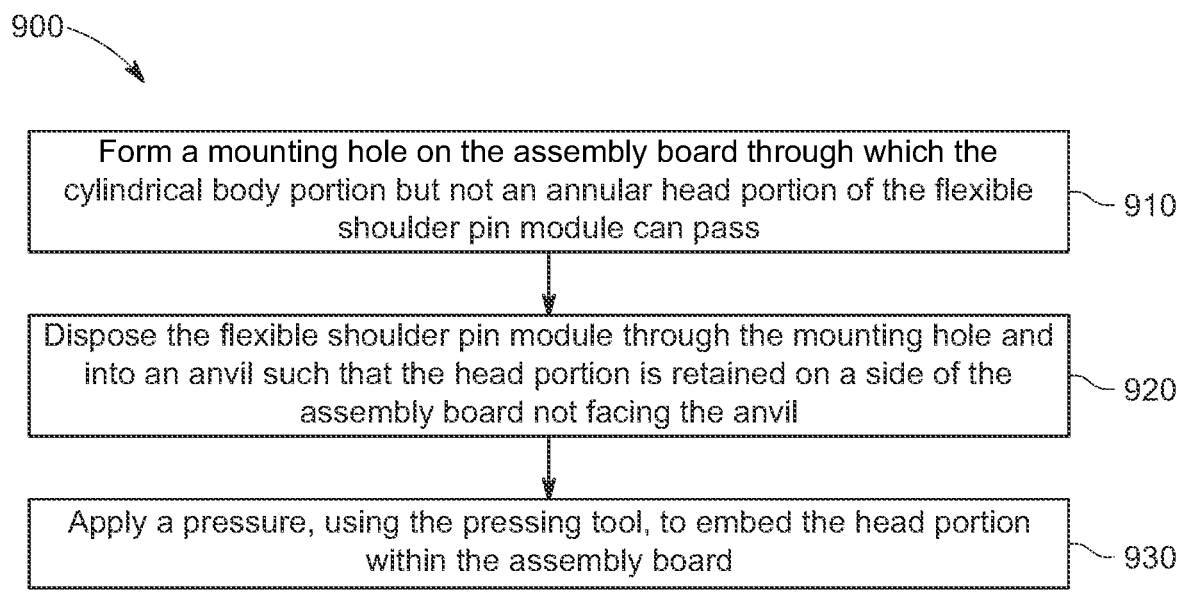
FIG. 9 shows a block diagram of a method of integrating a flexible shoulder pin module with the assembly board, according to one or more embodiments shown and described herein.

FIG. 4A depicts a side view of a method 900 of integrating the flexible shoulder pin module 100 with an assembly board 490. The method 900 is represented by the block diagram in FIG. 9. At block 910, a mounting hole is formed on the assembly board through which the cylindrical body portion, but not an annular head portion of the flexible shoulder pin module, can pass. In the embodiment shown in FIG. 4A, a mounting hole 495 is formed through the assembly board 490. The dimensions of the mounting hole 495 is such that the body portion 120, but not the head portion 110 of the flexible shoulder pin module 100, can pass. The punching tool 380 may be used for the step of forming the mounting hole 495.

At block 920, the flexible shoulder pin module is disposed through the mounting hole and into an anvil such that the head portion is retained on a side of the assembly board not facing the anvil. In the embodiment shown in FIG. 4A, the flexible shoulder pin module 100 is disposed over the anvil 330 through the mounting hole 495 such that the body portion 120 is placed within the opening 335 of the anvil, and the head portion 110 is retained outside on the side of the assembly board 490 not facing the anvil 330.

Figure 4B:
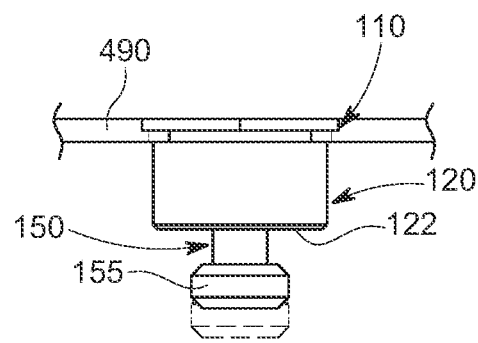
FIG. 4B is a side view of the flexible shoulder pin module integrated with the assembly board, according to one or more embodiments shown and described herein.
Figure 4C:
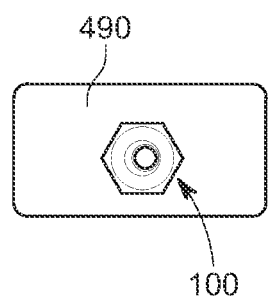
FIG. 4C is a top view of the flexible shoulder pin module integrated with the assembly board, according to one or more embodiments shown and described herein.

At block 930, a pressure is applied, using a pressing tool, to embed the head portion within the assembly board. In the embodiment shown in FIG. 4A, a pressure is applied, using a pressing tool, to embed the head portion 110 within the assembly board 490 such that the flexible shoulder pin 100 is fully integrated with the assembly 490. The punching tool 380 may be used as the pressing tool for this method step. However, in different embodiments, a dedicated pressing tool, different from the punching tool 380, may be used. FIGS. 4B-4C show a side view and a top view, respectively, of the flexible shoulder pin module 100 integrated with the assembly board 490. One or more flexible shoulder pin module 100 may be integrated into the assembly 490, according to the method 1000 described herein.

Figure 5A:
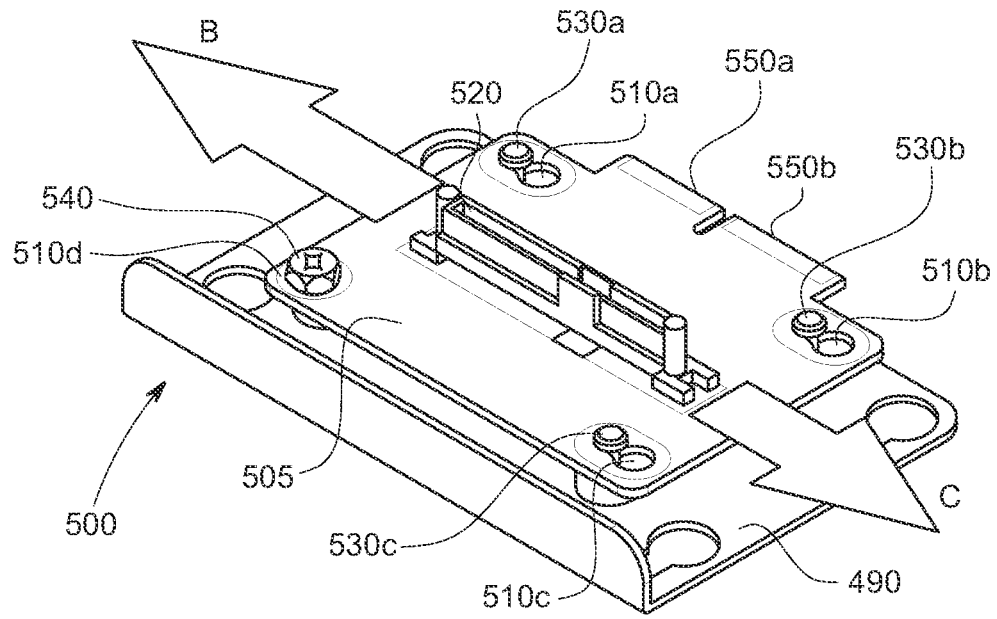
FIG. 5A is a perspective view of installing and removing a panel horizontally mounted on an assembly board using flexible shoulder pin modules of FIG. 1A, according to one or more embodiments shown and described herein.
Figure 5B:
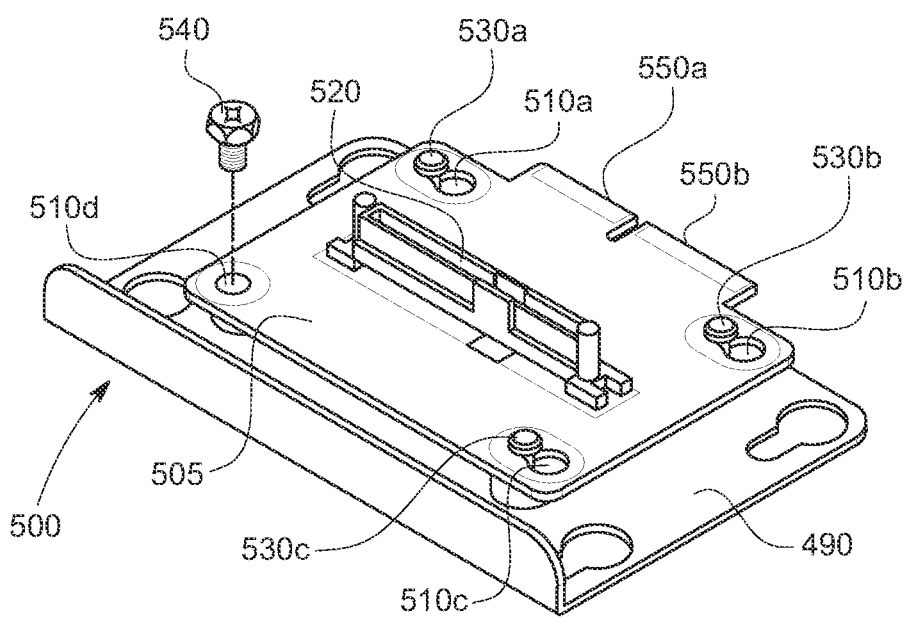
FIG. 5B is a perspective view of securing the panel horizontally mounted on the assembly board with a screw, according to one or more embodiments shown and described herein.

FIGS. 5A-5B show perspective views of a method 1000 for installing a PCB 505 or another panel horizontally mounted on the assembly board 490 using flexible shoulder pin modules 530a, 530b, and 530c to form a horizontal PCB assembly 500. The PCB 505 is similar to the PCB 210 described above. The PCB 505 has four holes 510a, 510b, 510c, and 510d which allow the PCB 505 to be mechanically fastened to the assembly board 490. The PCB 505 also includes a hard drive connector 520 and golden finger connectors 550a, 550b.

Figure 6A:
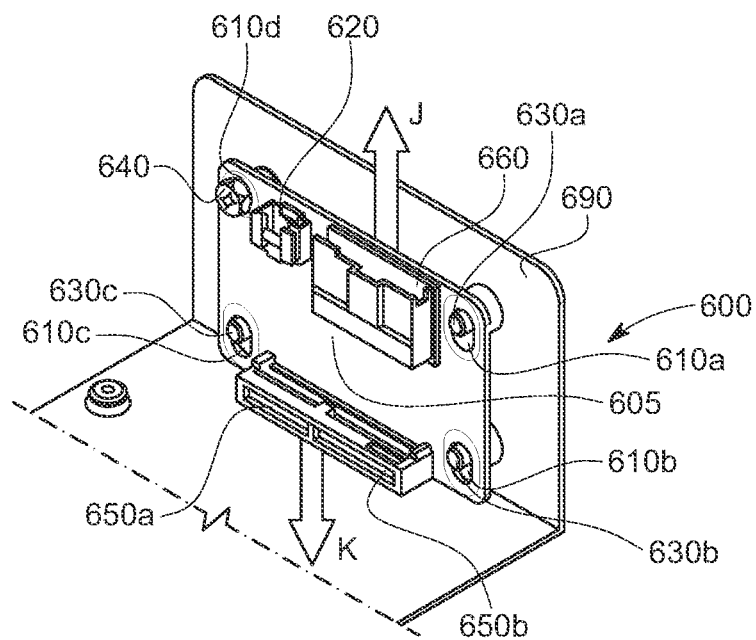
FIG. 6A is a perspective view of installing and removing a panel vertically mounted on an assembly board using flexible shoulder pin modules of FIG. 1A, according to one or more embodiments shown and described herein.
Figure 6B:
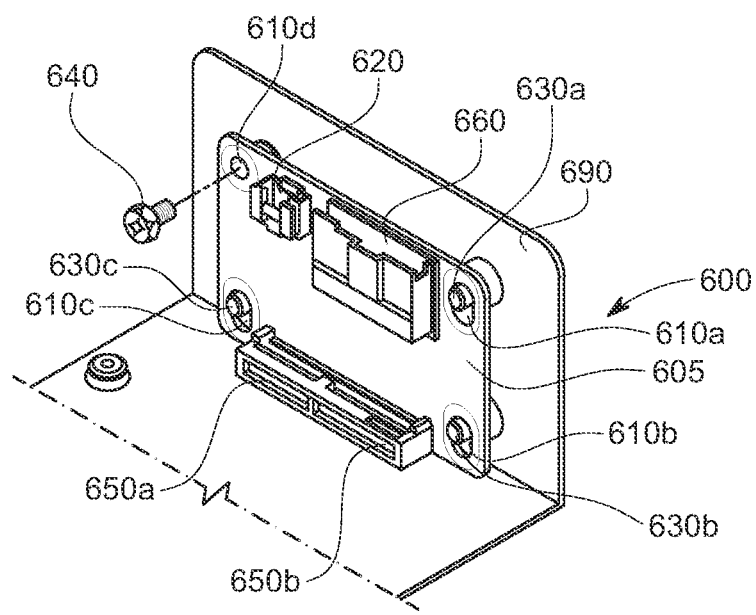
FIG. 6B is a perspective view of securing the panel vertically mounted on the assembly board with a screw, according to one or more embodiments shown and described herein.

FIGS. 6A-6B show perspective views of the method 1000 for installing the PCB 605 or another panel vertically mounted on an assembly board 690 using one or more flexible shoulder pin modules 100 to form a vertical PCB assembly 600. The PCB 605 is similar to the PCB 210 described above. The PCB 605 has four holes 610a, 610b, 610c, and 610d which allow the PCB 605 to be mechanically fastened to the assembly board 690. The PCB 605 also includes a power connector 620, PCIe signal connector 660, and mating connectors 650a, 650b configured to mate with the golden finger connectors 550a, 550b.

Figure 10:
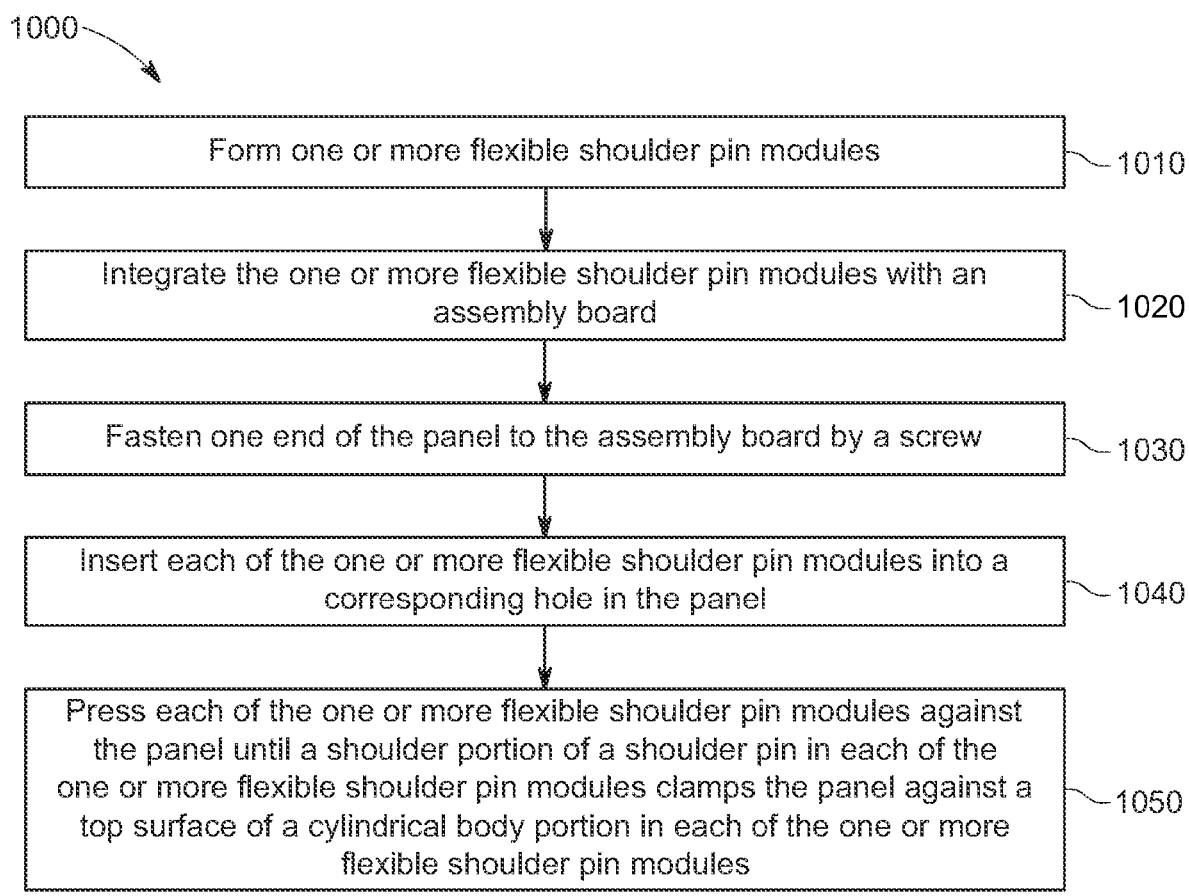
FIG. 10 shows a block diagram of a method of installing a panel on an assembly board of an assembly, according to one or more embodiments shown and described herein.

The method 1000 is represented by the block diagram of FIG. 10. At block 1010, one or more flexible shoulder pin modules are formed. In the embodiments shown herein, the flexible shoulder pin modules 530a, 530b, and 530c in FIGS. 5A-5B and the flexible shoulder pin modules 630a, 630b, and 630c in FIGS. 6A-6B are substantially similar to the flexible shoulder pin module 100, and formed by the method 800 described above with respect to FIGS. 3A-3D.

At block 1020, the one or more flexible shoulder pin modules are integrated with the assembly board. In some embodiments shown herein, the flexible shoulder pin modules 530a, 530b, and 530c are integrated with the assembly board 490 in FIGS. 5A-5B, and the flexible shoulder pin modules 630a, 630b, and 630c are integrated with the assembly board 690 in FIGS. 6A-6B by the method 900 described above with respect to FIGS. 4A-4C. At block 1030, one end of the panel is fastened to the assembly board by a screw. In the embodiments shown in FIGS. 5A-5B and 6A-6B, one end of the PCBs 505, 605 is fastened to the assembly boards 490, 690 by means of screws 540, 640 passing through holes 530d, 630d respectively on the PCBs 505, 605, as shown in FIGS. 5B and 6B.

At block 1040, the one or more flexible shoulder pin modules are inserted into a corresponding hole in the panel. In the embodiment shown in FIGS. 5A-5B, the flexible shoulder pin modules 530a, 530b, and 530c are inserted into corresponding holes 510a, 510b, and 510c on the PCB 505. In the embodiment shown in FIGS. 6A-6B, the flexible shoulder pin modules 630a, 630b, and 630c are inserted into corresponding holes 610a, 610b, and 610c on the PCB 605.

At block 1050, each of the one or more flexible shoulder pin modules are pressed against the panel until a shoulder portion of a shoulder pin in each of the one or more flexible shoulder pin modules clamps the panel against a top surface of a cylindrical body portion in each of the one or more flexible shoulder pin modules. In the embodiment shown in FIG. 5A, the PCB 505 is moved in the direction of arrow C parallel to the plane of the assembly board 490 to lock the flexible shoulder pin modules 530a, 530b, and 530c in the corresponding holes 510a, 510b, and 510c. Subsequently the PCB 505 is pressed towards the assembly board 490 in a direction perpendicular to the arrow C. The pressure of the flexible shoulder pin modules 530a, 530b, and 530c against the PCB 505 secures the PCB 505 to the assembly board 490. In the embodiment shown in FIG. 6A, the PCB 605 is moved in the direction of arrow K parallel to the plane of the assembly board 690 to lock the flexible shoulder pin modules 630a, 630b, and 630c in the corresponding holes 610a, 610b, and 610c. Subsequently the PCB 605 is pressed towards the assembly board 690 in a direction perpendicular to the arrow K. The pressure of the flexible shoulder pin modules 630a, 630b, and 630c against the PCB 605 secures the PCB 605 to the assembly board 690. As can be explained with respect to the flexible shoulder pin module 100 shown in FIGS. 1A-1E, the pressure is applied until the shoulder portion 155 of the shoulder pin 150 in the flexible shoulder pin module 100 clamps the PCBs 505, 605 against the top surface 122 of the body portion 120, such that the compressible device 170 is compressed within the through-hole 140 to secure the PCBs 505, 605 to the assembly boards 490, 690.

The flexible shoulder pin modules 530a, 530b, and 530c in FIGS. 5A-5B and the flexible shoulder pin modules 630a, 630b, and 630c in FIGS. 6A-6B also enable easy removal of the PCBs 505, 605 from the assembly boards 490, 690 respectively. In the embodiment shown in FIG. 5A, the PCB 505 is lifted-up from the assembly board 490 until the flexible shoulder pin modules 530a, 530b, and 530c unlock and unclamp against the PCB 505. The PCB 505 is then released by moving in the direction of arrow B, opposite to the arrow C, parallel to the plane of the assembly board 490. In the embodiment shown in FIG. 6A, the PCB 605 is lifted-up from the assembly board 690 until the flexible shoulder pin modules 630a, 630b, and 630c unlock and unclamp against the PCB 605. The PCB 605 is then released by moving in the direction of arrow J, opposite to the arrow K, parallel to the plane of the assembly board 690.

Figure 7A:
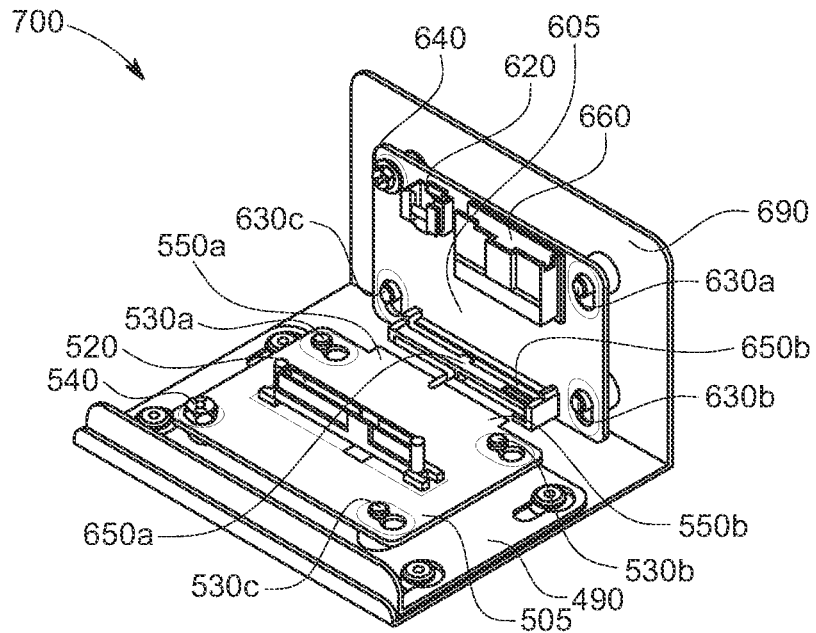
FIG. 7A is a perspective view of initiating a golden finger mating between the panel horizontally mounted on the assembly board of FIGS. 5A-5B and the panel vertically mounted on the assembly board of FIGS. 6A-6B, according to one or more embodiments shown and described herein.
Figure 7B:
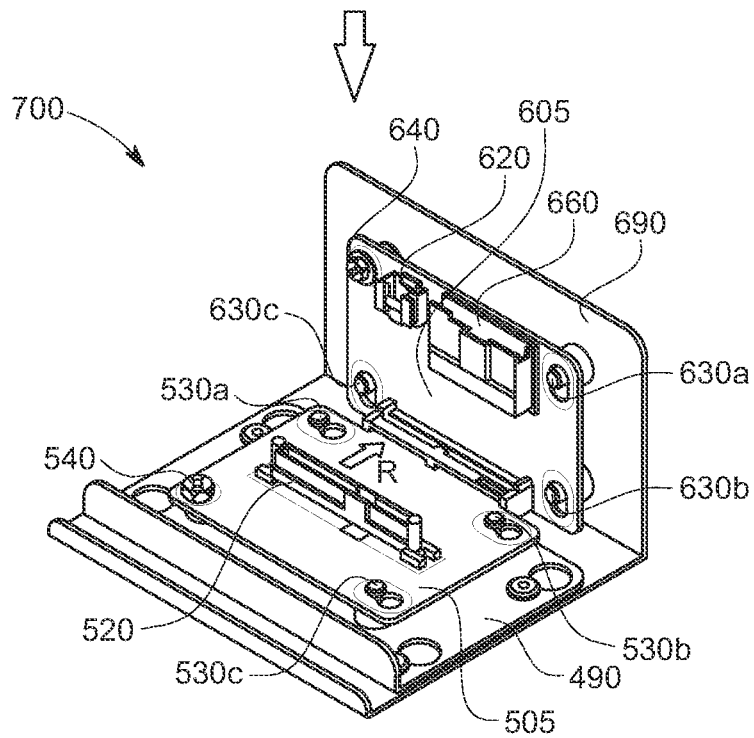
FIG. 7B is a perspective view of completed golden finger mating between the panel horizontally mounted on the assembly board of FIGS. 5A-5B and the panel vertically mounted on the assembly board of FIGS. 6A-6B, according to one or more embodiments shown and described herein.

FIG. 7A is a perspective view of initiating a golden finger mating between the PCB 505 of FIGS. 5A-5B and the PCB 605 of FIGS. 6A-6B, while FIG. 7B is a perspective view of completed golden finger mating between the PCBs 505, 605. The flexible shoulder pin modules 530a, 530b, and 530c enable the PCB 505 to be tightly secured to the assembly board 490 to form the horizontal PCB assembly 500, as described above. The flexible shoulder pin modules 630a, 630b, and 630c enable the PCB 605 to be tightly secured to the assembly board 690 to form the vertical PCB assembly 600, as described above. The horizontal PCB assembly 500 is moved towards the vertical PCB assembly 600 in a direction of arrow R such that the golden fingers 550a, 550b of the horizontal PCB assembly 500 can firmly mate with the mating connectors 650a, 650b of the vertical PCB assembly 600. Without implementation of the flexible shoulder pin modules 530a, 530b, and 530c in the horizontal PCB assembly 500 and flexible shoulder pin modules 630a, 630b, and 630c in the vertical PCB assembly 600, the PCBs 505 and 605 may be misaligned and exceed the maximum clearance allowed for firm mating of the golden fingers 550a, 550b with the mating connectors 650a, 650b, resulting in physical damage to any of the golden fingers 550a, 550b or with the mating connectors 650a, 650b, particularly in a blind mating scenario.

The embodiments of flexible shoulder pin modules described herein can be advantageously used to secure and release PCBs and panels to assembly boards. The PCBs and panels can be easily secured to assembly boards by pressing the shoulder portions of the flexible shoulder pin modules. The PCBs and panels can be quickly removed from assembly boards by simply sliding the PCBs and panels sideways and lifting off. The design of the flexible shoulder pin modules saves valuable time during the installation process and dramatically reduces the amount of floating movement and loose/unattached hardware in the assembly. This renders significant advantage during blind mating of golden finger mating between two assembly boards.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

While various embodiments of the present invention have been described above, it should be understood that they have been presented by way of example only, and not limitation. Although the invention has been illustrated and described with respect to one or more embodiments, equivalent alterations and modifications will occur or be known to others skilled in the art upon the reading and understanding of this specification and the annexed drawings. In addition, while a particular feature of the invention may have been disclosed with respect to only one of several embodiments, such feature may be combined with one or more other features of the other embodiments as may be desired and advantageous for any given or particular application. Thus, the breadth and scope of the present invention should not be limited by any of the above described embodiments. Rather, the scope of the invention should be defined in accordance with the following claims and their equivalents.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art.

Furthermore, terms, such as those defined in commonly used dictionaries, should be interpreted as having a meaning that is consistent with their meaning in the context of the relevant art, and will not be interpreted in an idealized or overly formal sense unless expressly so defined herein.

The invention claimed is:

1. A flexible shoulder pin module comprising:
a barrel comprising:
an annular head portion;
a cylindrical body portion formed on the head portion, the body portion having a lesser perimeter and a greater height than the head portion; and
a through-hole extending from a top surface of the body portion to a bottom end of the head portion, the through-hole having a first portion adjacent to the top surface of the body portion and a second portion having a greater diameter than the first portion;
a shoulder pin comprising:
a shaft portion configured to be insertable through the first portion of the through-hole and extend above the top surface of the body portion;
a shoulder portion formed on the shaft portion and configured to adjustably extend above the top surface of the body portion to clamp a panel thereto; and
a bottom wall forming an end of the shaft portion that is opposite to the shoulder portion;
a stopper panel having an aperture through which the bottom wall of the shoulder pin is received, the bottom wall of shoulder pin being inserted through the aperture of the stopper panel, the stopper panel and the shoulder pin being directly mechanically attached such that the stopper panel is movable with the shoulder pin, the stopper panel being positioned within the second portion of the through-hole adjacent to the head portion; and
a spring configured to be disposed around the shaft portion and secured within the second portion of the through-hole by the stopper panel;
wherein the bottom wall is flared and projects outward from a bottom surface of the stopper panel.

2. The flexible shoulder pin module of claim 1, wherein the head portion has a base of a closed geometric shape.

3. The flexible shoulder pin module of claim 1, wherein the body portion has a base of a closed geometric shape.

4. The flexible shoulder pin module of claim 1, wherein the spring is configured to compress within the second portion of the through-hole when the panel is secured to the flexible shoulder pin module and configured to decompress within the second portion of the through-hole when the panel is released from the flexible shoulder pin module.

5. The flexible shoulder pin module of claim 1, wherein the shoulder portion of the shoulder pin has a chamfered edge.

6. The flexible shoulder pin module of claim 1, wherein the second portion of the through-hole has a flared wall connecting to the first portion of the through-hole.

7. An assembly comprising:
at least one assembly board; and
a printed circuit board (PCB) panel secured to the at least one assembly board by a screw and at least one flexible shoulder pin module, the at least one flexible shoulder pin module comprising:
a barrel comprising:
an annular head portion;
a cylindrical body portion formed on the head portion, the body portion having a lesser perimeter and a greater height than the head portion; and
a through-hole extending from a top surface of the body portion to a bottom end of the head portion, the through-hole having a first portion adjacent to the top surface of the body portion and a second portion having a greater diameter than the first portion;
a shoulder pin comprising:
a shaft portion inserted through the first portion of the through-hole and extending above the top surface of the body portion;
a shoulder portion formed on the shaft portion and adjustably extending above the top surface of the body portion to clamp the PCB panel thereto; and
a bottom wall forming an end of the shaft portion that is opposite to the shoulder portion;
a stopper panel having an aperture through which the bottom wall of the shoulder pin is received, the bottom wall of shoulder pin being inserted through the aperture of the stopper panel, the stopper panel and the shoulder pin being directly mechanically attached such that the stopper panel is movable with the shoulder pin, the stopper panel being positioned within the second portion of the through-hole adjacent to the head portion; and
a spring disposed around the shaft portion and secured within the second portion of the through-hole by the stopper panel;
wherein the bottom wall is flared and projects outward from a bottom surface of the stopper panel.

8. The assembly of claim 7, wherein the head portion has a base of a closed geometric shape.

9. The assembly of claim 7, wherein the body portion has a base of a closed geometric shape.

10. The assembly of claim 7, wherein the spring is configured to compress within the second portion of the through-hole when the PCB panel is secured to the assembly and configured to decompress within the second portion of the through-hole when the PCB panel is released from the assembly.

11. The assembly of claim 7, wherein the shoulder portion of the shoulder pin has a chamfered edge.

12. The assembly of claim 7, wherein the second portion of the through-hole has a flared wall connecting to the first portion of the through-hole.

* * * * *